US008250626B2

(12) United States Patent
Rhoades et al.

(10) Patent No.: US 8,250,626 B2
(45) Date of Patent: Aug. 21, 2012

(54) SECURING DATA ACCESSED BY A SOFTWARE PACKAGE PRE-LOADED ON A COMPUTER SYSTEM

(75) Inventors: David B. Rhoades, Raleigh, NC (US); Simon C. Chu, Chapel Hill, NC (US); William M. Privette, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 938 days.

(21) Appl. No.: 11/556,358

(22) Filed: Nov. 3, 2006

(65) Prior Publication Data

US 2008/0109909 A1 May 8, 2008

(51) Int. Cl.
*G06F 7/04* (2006.01)
(52) U.S. Cl. .............. 726/2; 726/27; 726/10; 726/7; 726/19; 713/182; 713/183; 713/184; 713/179; 713/1; 705/44
(58) Field of Classification Search .............. 726/27, 726/2, 7, 19, 10; 713/182–184, 1, 100, 171, 713/179; 711/164; 705/18, 51, 44; 717/174
See application file for complete search history.

(56) References Cited

U.S. PATENT DOCUMENTS

| 4,683,553 | A | * | 7/1987 | Mollier | 705/55 |
| 5,375,243 | A | * | 12/1994 | Parzych et al. | 726/17 |
| 5,745,768 | A |  | 4/1998 | England et al. | |
| 6,005,939 | A |  | 12/1999 | Fortenberry et al. | |
| 6,009,401 | A | * | 12/1999 | Horstmann | 705/317 |
| 6,199,108 | B1 |  | 3/2001 | Casey et al. | |
| 6,549,914 | B1 |  | 4/2003 | Valys | |
| 6,633,977 | B1 | * | 10/2003 | Hamilton et al. | 713/100 |
| 6,760,708 | B1 |  | 7/2004 | Hubbard et al. | |
| 6,912,552 | B2 |  | 6/2005 | Hubbard et al. | |
| 2005/0091417 | A1 |  | 4/2005 | Bhogal | |
| 2005/0107898 | A1 | * | 5/2005 | Gannon et al. | 700/90 |
| 2005/0132182 | A1 |  | 6/2005 | Challener et al. | |
| 2005/0144429 | A1 | * | 6/2005 | Rhoades | 713/1 |
| 2006/0020810 | A1 | * | 1/2006 | Waltermann et al. | 713/179 |
| 2006/0111920 | A1 | * | 5/2006 | Jacobs et al. | 705/1 |
| 2007/0143611 | A1 | * | 6/2007 | Arroyo et al. | 713/171 |

OTHER PUBLICATIONS

IBM Workload Deployer: Pattern-based Application and Middleware Deployments in a Private Cloud Mar. 22, 2012. Source: IP.com.*
Using ThinkVantage Technologies: vol. 1 Creating and Deploying Client Systems Dec. 7, 2005. Source: IP.com.*

* cited by examiner

*Primary Examiner* — Thanhnga B Truong
*Assistant Examiner* — Angela Holmes
(74) *Attorney, Agent, or Firm* — Hoffman Warnick LLC; Cynthia Seal

(57) ABSTRACT

The present invention provides a way to secure data accessed by a software package pre-loaded on a computer system (for delivery to a customer). Specifically, under the present invention, customer data is loaded on a computer system along with any software package(s) that access the customer data prior to shipping the computer system to the customer. Also prior to shipping, a set (e.g., one or more) of passwords for accessing the data such as an administrative password and a hard disk password are set. After the computer system is shipped to the customer, confirmation of proper delivery will be sought. Once this confirmation is received, an access code such as a key or the set of passwords themselves will be shipped to the customer to unlock and use the data.

16 Claims, 2 Drawing Sheets

SECURING DATA ACCESSED BY A SOFTWARE PACKAGE PRE-LOADED ON A COMPUTER SYSTEM

BACKGROUND OF THE INVENTION

1. Field of the Invention

The present invention generally relates to data security. Specifically, the present invention provides a way to secure data that is accessed by a software package pre-loaded on a computer system for a customer.

2. Related Art

Currently, customers order computer systems with their specific images that may contain confidential and proprietary data/information. This could include network related items such as IP addresses, host names, etc. or in some cases templates for forms. This data is typically accessed by one or more software packages desired by the customer. These computer systems can be produced on a production floor via a disk cloning tool such as Drive Image Pro (Drive Image, Drive Image Pro, and related terms are trademarks of PowerQuest Corp. in the United States and/or other countries) or Norton Ghost (Norton, Norton Ghost, and related terms are trademarks of Symantec, Inc. in the United States and/or other countries). Once produced, these systems are then packaged and shipped to the customer's designated locations. If the systems were stolen or lost during shipping, the customer may have some of its information exposed to the outside world. In an effort to protect the data, current approaches require the seller and/or a service provider (e.g., an "installer") to travel to the customer's site to manually complete the installation of the desired software package(s) and unlock the customer data.

Such an approach is both inefficient and costly. Moreover, various complications could arise at the customer's site for which the installer is ill equipped to handle. In view of the foregoing, there exists a need for a solution that addresses at least one deficiency in the related art.

SUMMARY OF THE INVENTION

In general, the present invention provides a way to secure data accessed by a software package pre-loaded on a computer system (for delivery to a customer). Specifically, under the present invention, customer data (e.g., confidential/proprietary data) is loaded on a computer system along with any software package(s) that access the customer data prior to shipping the computer system to the customer (e.g., the data and software package(s) are hence considered "pre-loaded"). Also prior to shipping, a set (e.g., one or more) of passwords for accessing the data such as an administrative password and a hard disk password are set. After the computer system is shipped to the customer, confirmation of proper delivery will be sought. Proper delivery includes ensuring that the computer system was delivered intact to the correct party. Once this confirmation is received, an access code such as a key or the set of passwords themselves will be shipped to the customer. Specifically, the access code will be shipped to a service processor such as a Remote Supervisor Adapter (RSA) associated with the computer system. The arrival of the access code will be detected by a BIOS. A decoding program (loaded on the computer system or on the other device) will then be executed that will use the access code to complete the installation of the software package(s), and unlock the customer data.

A first aspect of the present invention provides a method for securing data, comprising: setting a set of passwords for accessing data utilized by a software package loaded on a computer system; confirming a delivery of the computer system to a recipient; and sending an access code for the set of passwords separately from the computer system to enable installation of the software package.

A second aspect of the present invention provides a system for securing data, comprising: a system for setting a set of passwords for accessing data utilized by a software package loaded on a computer system; a system for receiving a confirmation of a delivery of the computer system to a recipient; and a system for sending an access code for the set of passwords separately from the computer system to enable installation of the software package.

A third aspect of the present invention provides a program product stored on a first computer readable medium for securing data, the first computer readable medium comprising program code for causing a first computer to perform the following: set a set of passwords for accessing data utilized by a software package loaded on a second computer system; confirm a delivery of the second computer system to a recipient; and send an access code for the set of passwords separately from the second computer system to enable installation of the software package.

A fourth aspect of the present invention provides a method for deploying a system for securing data, comprising: providing a computer infrastructure being operable to: set a set of passwords for accessing data utilized by a software package loaded on a computer system; confirm a delivery of the computer system to a recipient; and send an access code for the set of passwords separately from the computer system to enable installation of the software package.

A fifth aspect of the present invention provides computer software embodied in a propagated signal for securing data, the computer software comprising instructions for causing a first computer to perform the following: set a set of passwords for accessing data utilized by a software package loaded on a second computer system; confirm a delivery of the second computer system to a recipient; and send an access code for the set of passwords separately from the second computer system to enable installation of the software package.

A data processing system comprising: at least one processor, a bus coupled to the at least one processor, at least one memory medium coupled to the bus, the at least one memory medium comprising instructions, and the processor being configured to execute the instructions to cause the data processing system to: set a set of passwords for accessing data utilized by a software package loaded on a computer system; confirm a delivery of the computer system to a recipient; and send an access code for the set of passwords separately from the computer system to enable installation of the software package.

Therefore, the present invention provides an approach for securing data accessed by a software package(s) loaded on a computer system.

BRIEF DESCRIPTION OF THE DRAWINGS

These and other features of this invention will be more readily understood from the following detailed description of the various aspects of the invention taken in conjunction with the accompanying drawings in which.

Figure 1:
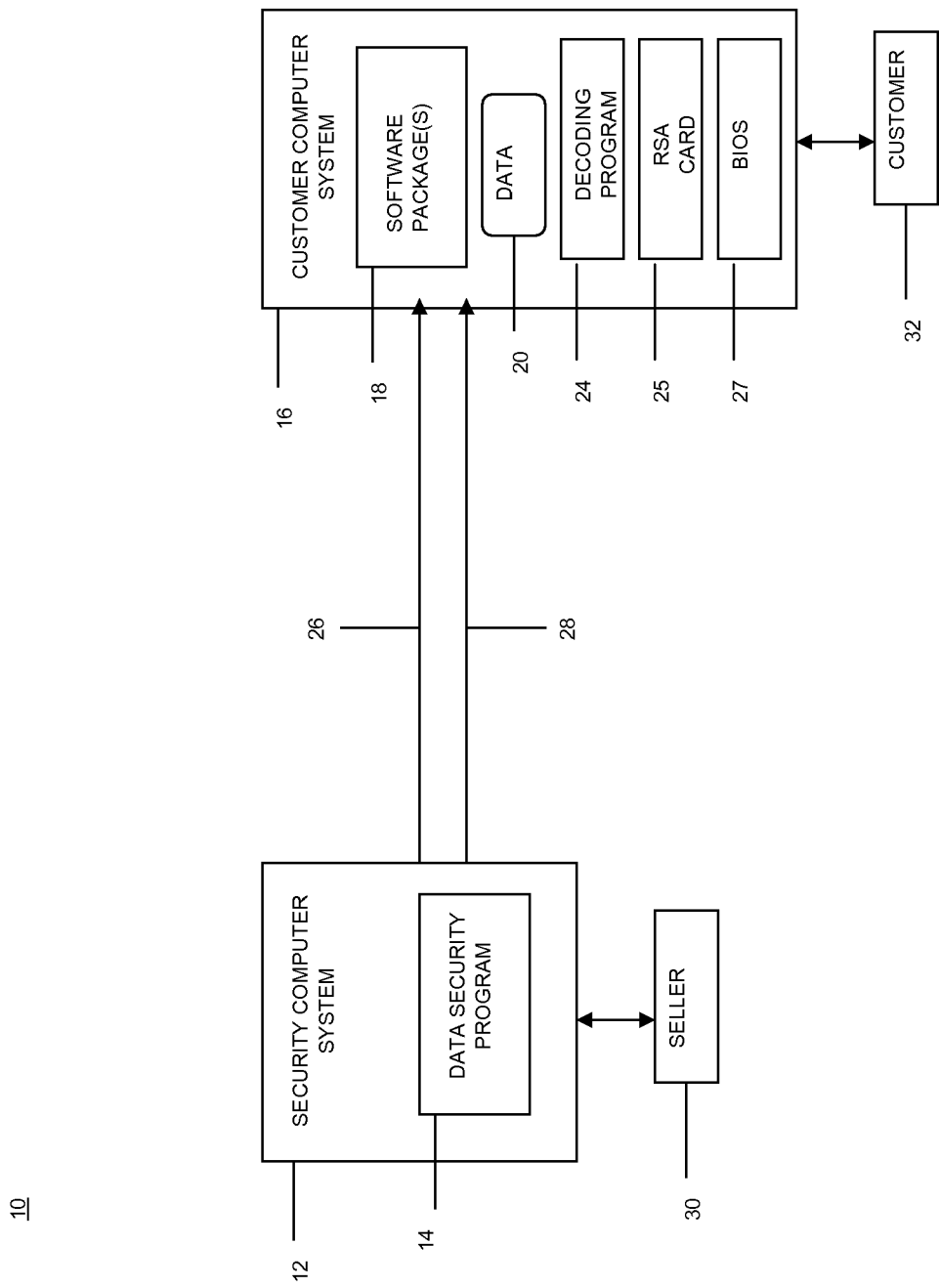
FIG. 1 depicts a system for securing data accessed by a software package loaded on a computer system in accordance with an aspect of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:

I. General Description
II. Computerized Implementation

I. General Description

The present invention provides a way to secure data accessed by a software package pre-loaded on a computer system (for delivery to a customer). Specifically, under the present invention, customer data (e.g., confidential/proprietary data) is loaded on a computer system along with any software package(s) that access the customer data prior to shipping the computer system to the customer (e.g., the data and software package(s) are hence considered "pre-loaded"). Also prior to shipping, a set (e.g., one or more) of passwords for accessing the data such as an administrative password and a hard disk password are set. After the computer system is shipped to the customer, confirmation of proper delivery will be sought. Proper delivery includes ensuring that the computer system was delivered intact to the correct party. Once this confirmation is received, an access code such as a key or the set of passwords themselves will be shipped to the customer. Specifically, the access code will be shipped to a service processor such as a Remote Supervisor Adapter (RSA) associated with the computer system. The arrival of the access code will be detected by a BIOS. A decoding program (loaded on the computer system or on the other device) will then be executed that will use the access code to complete the installation of the software package(s) (optional), and unlock the customer data.

Referring now to FIG. 1, a system 10 for securing data 20 accessed by a software package(s) 18 (e.g., managing data security) according to an aspect of the present invention is shown. In general, system 10 includes a data security program 14 shown loaded on a security computer system 12. Also shown in system 10 is customer computer system 16 having software package(s) 18, data 20, decoding program 24, RSA card 25, and BIOS 27. It should be understood in advance that although two computer systems 12 and 16, and are shown, this need not be the case. For example, the functionality provided here could be provided with more than two computer systems In any event, assume that provider/seller 30 is selling customer computer system 16 and/or software package(s) 18 to customer/buyer 32. Under previous approaches, a seller would have shipped customer computer system 16 to customer 32, and then sent a technician to the customer 32's location to manually install software package(s) 18 and (customer) data 20. Under the present invention, this process is automated to eliminate the need for a physical/manual effort by a technician, while ensuring the security of data 20.

Specifically, when customer computer system 16 is assembled/produced (but prior to its shipping to customer 32), software package(s) 18 will be loaded thereon along with data 20 (because software package(s) 18 and data 20 are loaded prior to shipping, they may be referred to herein as being "pre-loaded"). Under the present invention, before computer system 16 is shipped, data 20 will be secured/ protected with a set (e.g., one or more) of passwords by data security program 14. Along these lines, the set of passwords typically include an administrative or software layer password, and a hard disk or hardware layer password that can be generated by data security program 14. The set of passwords could also include a key for encrypting data 20.

Once data 20 has been secured, customer computer system 16 will be shipped to customer 32 via path 26 using any shipping method now known or later developed. Data security program 14 will then confirm proper delivery. Proper delivery generally means that customer computer system 16 was delivered intact to the proper customer 32. In making this confirmation, data security program 14 can be configured to transmit data to and/or from (e.g., query and/or receive information) an independent shipper system, customer 32, etc. Once delivery is confirmed, data security program 14 will generate and send an access code for the set of passwords to RSW card 25 via path 28. In general, the access code can comprise the set of passwords themselves, a key for decrypting the set of passwords, etc.

In any event, the access code will be communicated by data security program 14 to RSA card 25, which is plugged into a slot of customer computer system 16. Along these lines, RSA card 25 is controlled remotely by a user with a network with log-in security. RSA card 25 can communicate with customer computer system 16 and manage the same. In any event, the presence of the access code will be detected by a BIOS 27. Once detected, decoding program 24 will run to complete any needed installation of software package(s) 18, and/or decode/ unlock data 20 using the access code.

Specifically, RSA card 25 receives the access code via external out of band interfaces via path 28. Once it has validated credentials for the proper authentication, it then can pass this onto BIOS 27. At boot time, BIOS 27 will query RSA card 25 (via some predefined register or mailbox message passing architecture) to determine if RSA card 25 has received the access code via an authorized mechanism as described above. Once it has been validated that the access code has been received, BIOS 27 will read the access code from RSA card 25 and use it to decode data 20 via a decryption algorithm. As shown, two separate delivery paths 26 and 28 are utilized under the present invention for improved security.

II. Computerized Implementation

Figure 2:
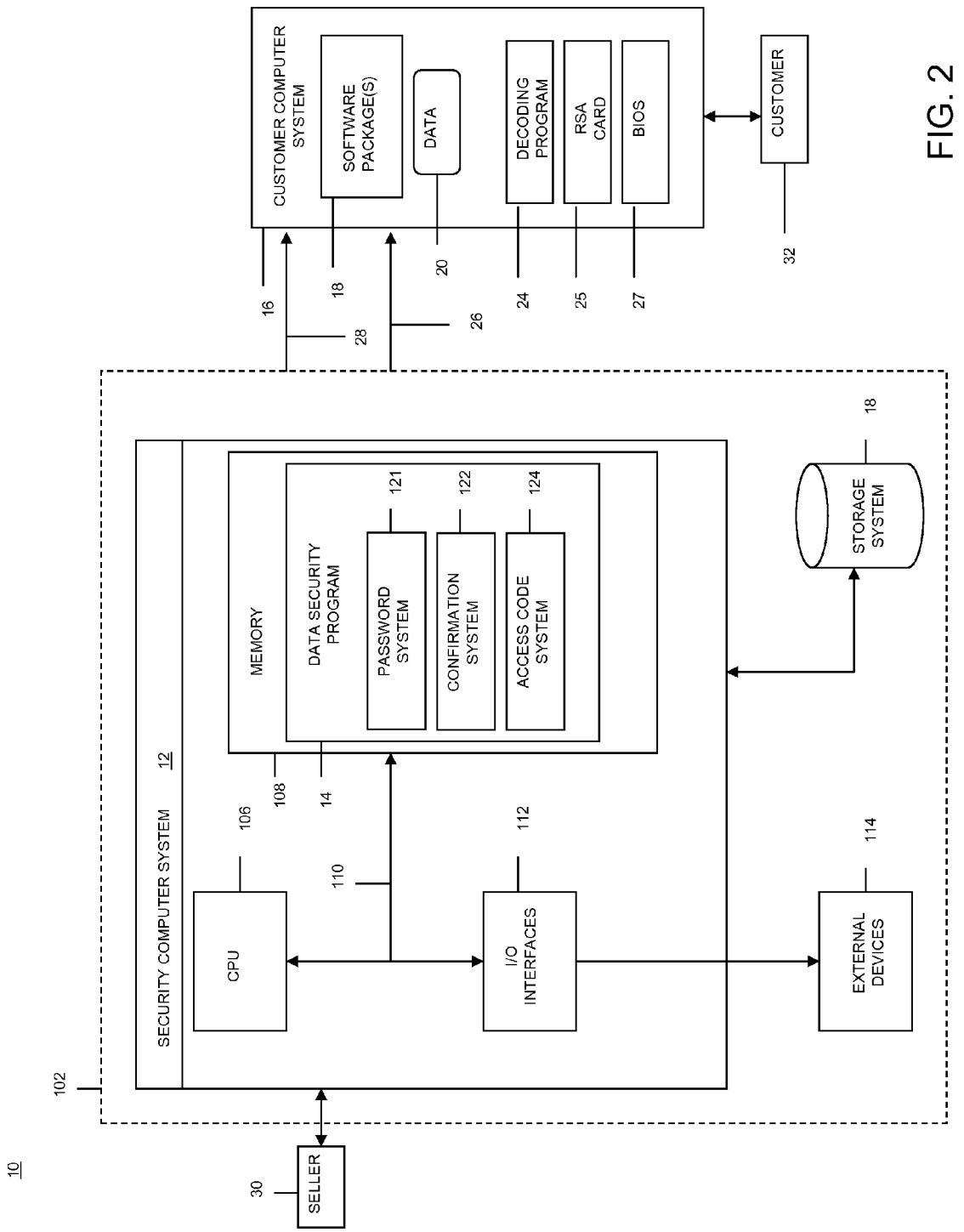
FIG. 2 depicts a more specific computerized diagram of the system of FIG. 1.

Referring now to FIG. 2, a more specific computerized implementation of system 10 according to the present invention is shown. As depicted, system 10 includes security computer system 12 deployed within a computer infrastructure/ environment 102. This is intended to demonstrate, among other things, that some or all of the teachings of the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of system 10 could be deployed, managed, serviced, etc. by a service provider who offers to secure customer data.

As shown, security computer system 12 includes a central processing unit (CPU) 106, a memory 108, a bus 110, and input/output (I/O) interfaces 112. Further, security computer system 12 is shown in communication with external I/O devices/resources 114 and storage system 18. In general, processing unit 106 executes computer program code, such as data security program 14, which is stored in memory 108. While executing computer program code, processing unit 106 can read and/or write data to/from memory 108, storage system 18, and/or I/O interfaces 112. Bus 110 provides a communication link between each of the components in security computer system 12. External devices 114 can comprise any devices (e.g., keyboard, pointing device, display, etc.) that enable a user to interact with security computer system 12 and/or any devices (e.g., network card, modem, etc.) that enable security computer system 12 to communicate with one or more other devices.

Computer infrastructure 102 is only illustrative of various types of computer infrastructures for implementing the invention. For example, in one embodiment, computer infrastructure 102 comprises two or more devices (e.g., a server cluster) that communicate over a network to perform the process(es) of the invention. Moreover, security computer system 12 is only representative of various possible computer systems that can include numerous combinations of hardware. To this extent, in other embodiments, security computer system 12 can comprise any specific purpose article of manufacture comprising hardware and/or computer program code for performing specific functions, any article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 18 can comprise any combination of various types of data storage and/or transmission media that reside at one or more physical locations. Further, I/O interfaces 112 can comprise any system for exchanging information with one or more external devices 114. Still further, it is understood that one or more additional components (e.g., system software, math co-processing unit, etc.) not shown in FIG. 2 can be included in security computer system 12. However, if security computer system 12 comprises a handheld device or the like, it is understood that one or more external devices 114 (e.g., a display) and/or storage system 18 could be contained within security computer system 12, not externally as shown.

Storage system 18 can be any type of system (e.g., a database) capable of providing storage for information under the present invention. To this extent, storage system 18 could include one or more storage devices, such as a magnetic disk drive or an optical disk drive. In another embodiment, storage system 18 includes data distributed across, for example, a local area network (LAN), wide area network (WAN) or a storage area network (SAN) (not shown). Storage system 18 could also represent code that dynamically responds to queries by parsing files as information is requested. It should be understood that although not shown, customer computer system 16 typically includes a computerized components similar to security computer system 12. Such components have not been shown for clarity. In addition, it should be appreciated that although not shown, customer computer system 16 can be deployed within one or more computer infrastructures.

Shown in memory 108 of security computer system 12 is data security program 14, which includes password system 121, confirmation system 122 and access code system 124. It should also be understood that the various systems and their sub-systems of FIG. 2 are shown as such for illustrative purposes only and that the same functionality could be implemented with a different configuration of systems and sub-systems.

Regardless, following the illustrative example set forth above, once customer computer system 16 has been assembled, and software package(s) 18 and data 20 have been loaded thereon (e.g., on a hard disk or the like), password system 121 will secure/encrypt data 20 using a set of passwords (e.g., previously stored or generated by password system 121). After customer computer system 16 has been shipped, successful delivery will be confirmed by confirmation system 122 (e.g., based upon information exchange with one or more other systems). After such confirmation is received, access code system 124 will send the access code for decoding data 20 (the access code can be generated by password system 121 or access code system 124). The access code will be received via path 28 by RSA card 25, and then detected/passed onto BIOS 27, which will cause decoding program 24 to use the access code to unlock/decode data 20, and/or complete any needed installation of software package (s) 18, which can be pre-loaded on a hard disk or the like of customer computer system 16.

While shown and described herein as data security solution, it is understood that the invention further provides various alternative embodiments. For example, in one embodiment, the invention provides a computer-readable/useable medium that includes computer program code to enable a computer infrastructure to manage data security. To this extent, the computer-readable/useable medium includes program code that implements each of the process of the invention. It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a device, such as memory 108 (FIG. 2) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to manage data security. In this case, the service provider can create, maintain, deploy, support, etc., a computer infrastructure, such as computer infrastructure 102 (FIG. 2) that performs the process of the invention for one or more customers. In return, the service provider can receive payment from the target organization(s) under a subscription and/or fee agreement and/or the service provider can receive payment from the sale of advertising content to one or more third parties.

In still another embodiment, the invention provides a computer-implemented method for managing data security. In this case, a computer infrastructure, such as computer infrastructure 102 (FIG. 2), can be provided and one or more systems for performing the process of the invention can be obtained (e.g., created, purchased, used, modified, etc.) and deployed to the computer infrastructure. To this extent, the deployment of a system can comprise one or more of (1) installing program code on a device, such as security computer system 12 (FIG. 2), from a computer-readable medium;

(2) adding one or more devices to the computer infrastructure; and (3) incorporating and/or modifying one or more existing systems of the computer infrastructure to enable the computer infrastructure to perform processes according to one or more aspects of the invention.

As used herein, it is understood that the terms "program code" and "computer program code" are synonymous and mean any expression, in any language, code or notation, of a set of instructions intended to cause a device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular providing and/or I/O device, and the like.

Aspects of the invention can take the form of an entirely software embodiment or an embodiment containing both hardware and software elements. In an embodiment, aspects of the invention are implemented in software, which includes but is not limited to firmware, resident software, microcode, etc. Furthermore, aspects of the invention can take the form of a computer program product accessible from at least one computer-usable or computer-readable medium storing program code for use by or in connection with a computer or any instruction execution system. For the purposes of this description, a computer-usable or computer readable medium can be any tangible apparatus that can contain, store, communicate, propagate, and/or transport the program for use by or in connection with the instruction execution system, apparatus, device, and/or the like.

The medium can be an electronic, magnetic, optical, electromagnetic, infrared, or semiconductor system (or apparatus or device), a propagation medium, and/or the like. Examples of a computer-readable medium include, but are not limited to, a semiconductor or solid state memory, magnetic tape, a removable computer diskette, a random access memory (RAM), a read-only memory (ROM), a rigid magnetic disk and an optical disk. Current examples of optical disks include, but are not limited to, compact disk-read only memory (CD-ROM), compact disk-read/write (CD-R/W) and DVD.

A data processing system suitable for storing and/or executing program code can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for securing data, comprising:
   setting, by a computer device of a provider of a computer system, a set of passwords on the computer system for accessing data of a recipient that has been provided by the recipient and that is utilized by a software package pre-loaded on the computer system, the data being pre-loaded on the computer system;
   shipping the computer system with the pre-loaded software package and the data to the recipient, the shipping including physically re-locating a physical device of the computer system with the pre-loaded software package and the data installed thereon;
   confirming, by the computer device, a delivery of the computer system to a physical location of the recipient by sending a communication from the recipient to the provider; and sending, from the computer device to the recipient upon confirmation of the delivery, an access code for the set of passwords separately from the computer system to enable initial utilization of the software package; and
   sending comprising sending a message containing the access code to a service processor, the service processor being a Remote Supervisor Adapter (RSA) card coupled to a computer device of the recipient and accessed by a BIOS of the computer system at boot time.

2. The method of claim 1, further comprising:
   detecting the access code; and
   using the access code to complete installation of the software package and unlock the data.

3. The method of claim 1, further comprising loading the software package on the computer system, wherein the software package is included in an image taken from a prior computer system of the recipient.

4. The method of claim 1, further comprising sending the computer system to the recipient prior to the confirming.

5. The method of claim 1, the access code comprising a key.

6. The method of claim 1, the access code comprising the set of passwords.

7. The method of claim 1, the set of passwords comprising an administrative password and a hard disk password.

8. The method of claim 2, the using comprising executing a decoding program to use the access code.

9. A system for securing data, comprising:
   a computer device;
   a system for setting, by a provider of a computer system, a set of passwords on the computer system for accessing data of a recipient that has been provided by the recipient and that is utilized by a software package pre-loaded on the computer system, the data being preloaded on the computer system;
   a system for receiving a confirmation of a delivery of the computer system with the pre-loaded software package and the data from the provider to a physical location the recipient via a communication from the recipient to the provider, the delivery including a physical re-location of a physical device of the computer system with the pre-loaded software package and the data installed thereon;
   a system for sending, upon the confirmation of the delivery, an access code for the set of passwords separately from the computer system to enable initial utilization of the software package; and
   wherein the system for sending sends a message containing the access code to a service processor, the service processor being a Remote Supervisor Adapter (RSA) card coupled to a computer device of the recipient and accessed by a BIOS of the computer system at boot time.

10. The system of claim 9, further comprising:
a BIOS for detecting the access code; and
a system for using the access code to complete installation of the software package and unlock the data.

11. The system of claim 9, the access code comprising a key.

12. The system of claim 9, the access code comprising the set of passwords.

13. The system of claim 9, the set of passwords comprising an administrative password and a hard disk password.

14. A program product stored on a first computer readable storage device for securing data, the first computer readable medium comprising program code for causing a first computer to perform the following:
set, by a provider of a computer system, a set of passwords on the computer system for accessing data of a recipient that has been provided by the recipient and that is utilized by a software package pre-loaded on the computer system, the data being preloaded on the computer system;
confirm a delivery of the computer system with the pre-loaded software package and the data the provider to a physical location the recipient via a communication from the recipient to the provider, the delivery including a physical re-location of a physical device of the computer system with the pre-loaded software package and the data installed thereon;
send, upon confirmation of the delivery, an access code for the set of passwords separately from the second computer system to enable initial utilization of the software package; and
the access code being sent in a message to a service processor, the service processor being a Remote Supervisor Adapter (RSA) card coupled to a computer device of the recipient and accessed by a BIOS of the computer system at boot time.

15. The program product of claim 14, further comprising program code stored on a second computer readable medium, the second computer readable medium comprising program code for causing the second computer system to perform the following:
detect the access code; and
use the access code to complete installation of the software package and unlock the data.

16. A method for deploying a system for securing data, comprising:
providing a computer infrastructure, including a computer device being operable to:
set, by a provider of a computer system, a set of passwords on the computer system for accessing data of a recipient that has been provided by the recipient and that is utilized by a software package pre-loaded on the computer system, the data being preloaded on the computer system;
confirm a delivery of the computer system with the pre-loaded software package and the data the provider to a physical location the recipient via a communication from the recipient to the provider, the delivery including a physical re-location of a physical device of the computer system with the pre-loaded software package and the data installed thereon;
send, upon confirmation of the delivery, an access code for the set of passwords separately from the computer system to enable initial utilization of the software package; and
the access code being sent in a message to a service processor, the service processor being a Remote Supervisor Adapter (RSA) card coupled to a computer device of the recipient and accessed by a BIOS of the computer system at boot time.

* * * * *